United States Patent [19]

Tsai

[11] Patent Number: 4,831,719

[45] Date of Patent: May 23, 1989

[54] MANUFACTURING METHOD OF A KEYBOARD

[76] Inventor: Huo L. Tsai, 6-6 Fl., No. 10, Chin Shan Road, Taichung City, Taiwan

[21] Appl. No.: 113,760

[22] Filed: Oct. 28, 1987

[51] Int. Cl.⁴ .................................... H01H 11/00
[52] U.S. Cl. ................................. 29/622; 264/297.2; 264/297.8
[58] Field of Search ............. 29/622; 264/297.2, 297.4, 264/297.8, 294, 250; 425/DIG. 201; 200/5 A

[56] References Cited

U.S. PATENT DOCUMENTS 2,492,973  1/1950  Dofsen et al. ............... 264/297.8
3,651,191  3/1972  Glatt et al. ................... 264/163
4,720,625  1/1988  Arney et al. ................. 29/451

Primary Examiner—P. W. Echols

[57] ABSTRACT

A method for producing keyboards by which the majority of manual labor can be omitted, and which primarily includes the following steps: molding keys from an injection mold in which the arrangements of the cavities thereof are the same as those of a commercial keyboard; moving the molded keys out of the injection mold and socketing the molded keys with a number of corresponding switches of a board by using a taking-out device; and pressing the molded keys tightly together with the corresponding switches so as to form a complete keyboard.

6 Claims, 9 Drawing Sheets

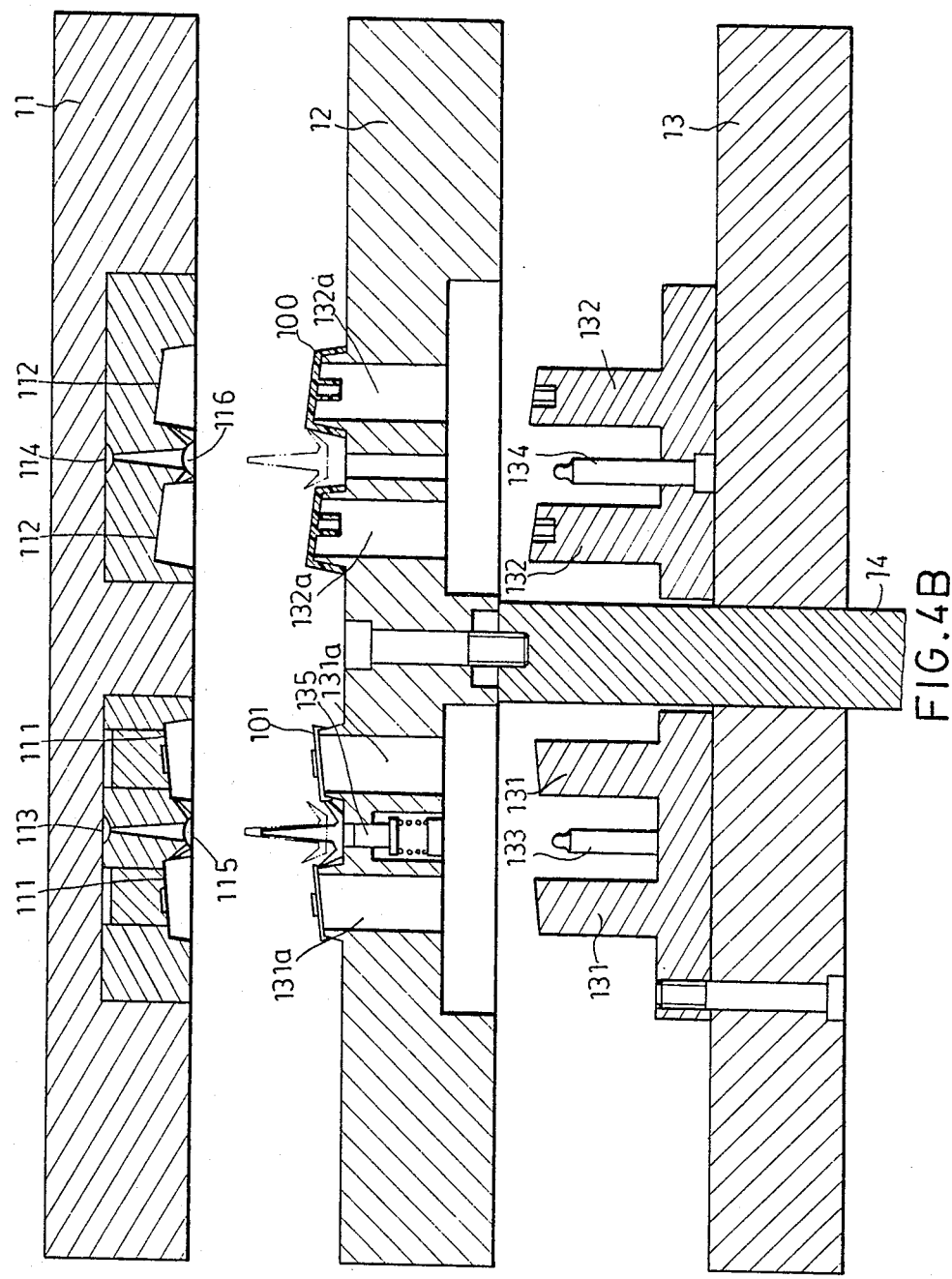

MANUFACTURING METHOD OF A KEYBOARD

BACKGROUND OF THE INVENTION

This invention relates to a method for producing keyboards, and more particularly to a method by which keys can be removed easily from an injection mold and automatically assembled to switches mounted on a board to form a complete keyboard. The method of this invention is most suitable to be applied to the industry of computer keyboards.

With the coming of the informational era, the need for computers with respect to every aspect of business has drastically increased in the past ten years. As a consequence, computer manufacturers all over the world are doing everything possible to improve the quality of their products while decreasing their production costs so as to satisfy their customers.

However, heretofore, all known keyboards are still being assembled by hand. More specifically speaking, molded keys are assembled one by one onto switches of a keyboard. This traditional assembly method has at least the following disadvantages: it must be performed through the eyes of laborers in order that the orientation and direction of keys and locations of switches can be identified, which not only results in many faulty assemblies but also consumes an excessive and undesirable amount of time. Thus, it can be appreciated that a more effective and time efficient key board production method is long overdue.

SUMMARY OF THE INVENTION

According to the present invention, a method for automatically producing keyboards comprises the following steps: 1) molding keys in an injection mold in which the arrangement of the cavities thereof coincides with those of the commercial keyboard; 2) moving the relative halves of the mold so as to release the molded keys from the mold; 3) using a device to take the keys out of the mold and to keep arrangements therebetween the same as they were when the keys were in the mold; 4) socketing the molded keys with a number of corresponding switches mounted on a board by the taking-out device stated above; and 5) pressing the socketed keys tightly together with the corresponding switches thereby completing the assembly of a computer keyboard without requiring any of the tedious traditional labor.

Accordingly, it is the general object of the present invention to overcome the above stated disadvantages of the prior keyboard manufacturing method.

It is a more particular object of the present invention to provide an entirely novel manufacturing method of keyboards by which the traditional classification, storage and transportation of the molded keys can be totally omitted.

It is another object of the present invention to provide a novel method for assembling computer keyboards in a very economical way.

The novel features which are considered to be characteristics of this invention are set forth in particular in the appended claims. The invention itself, however, as to its operation of steps, together with additional objects and advantages thereof, will be best understood from the following description of an apparatus, which performs the operation of the invention, when read in connection with the accompanying drawings.

BRIEF DESCRIPTION OF THE DRAWINGS

FIG. 4B is a partial sectional view of the mold assembly shown in FIG. 1 for illustrating the open condition of the mold assembly after the first injection step of a two-coloring injection molding;

DETAILED DESCRIPTION OF THE PREFERRED EMBODIMENT

Figure 1:
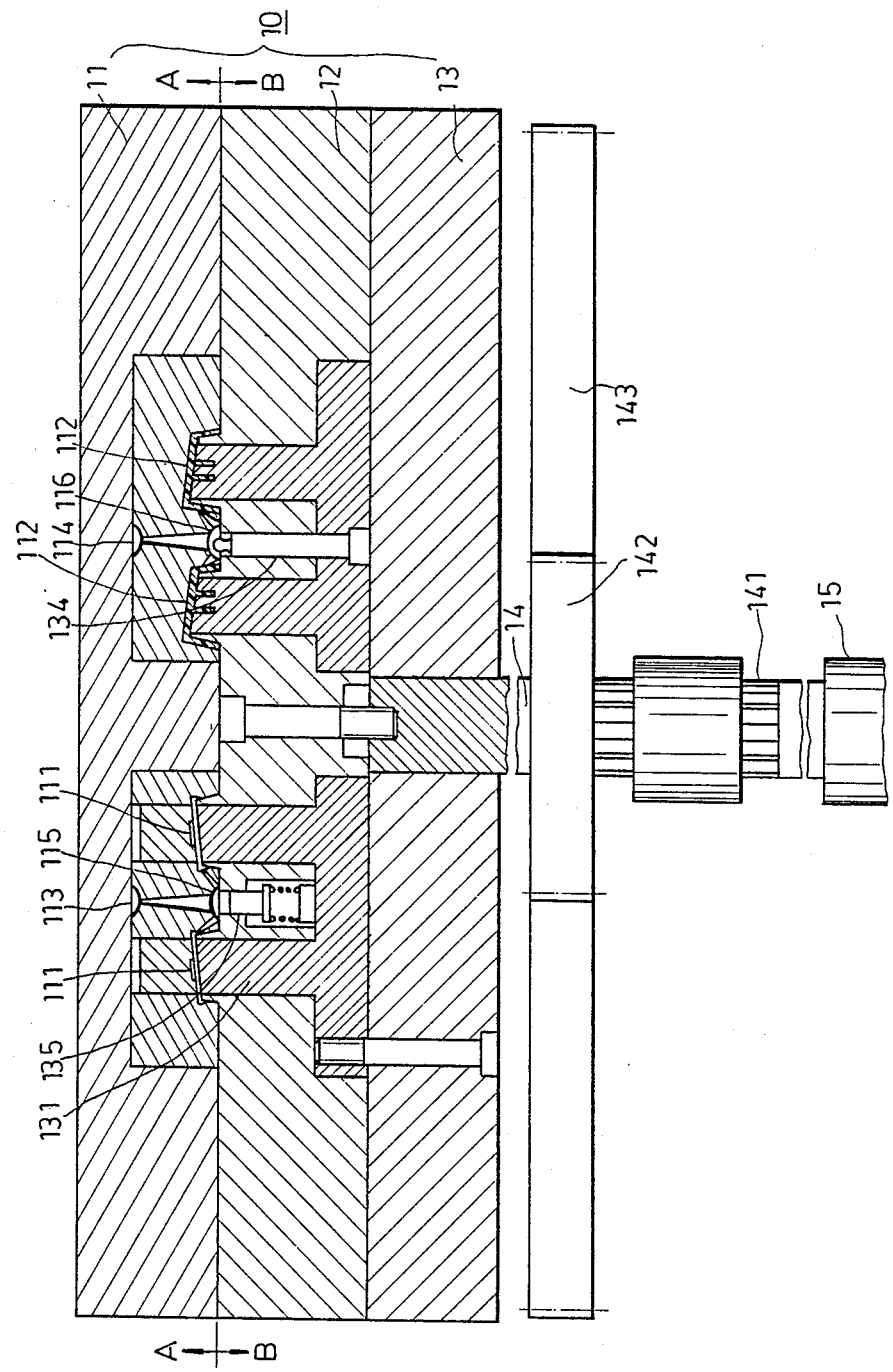
FIG. 1 is a sectional view of a mold assembly of an apparatus, which is used to illustrate the operational method according to the invention.
Figure 2:
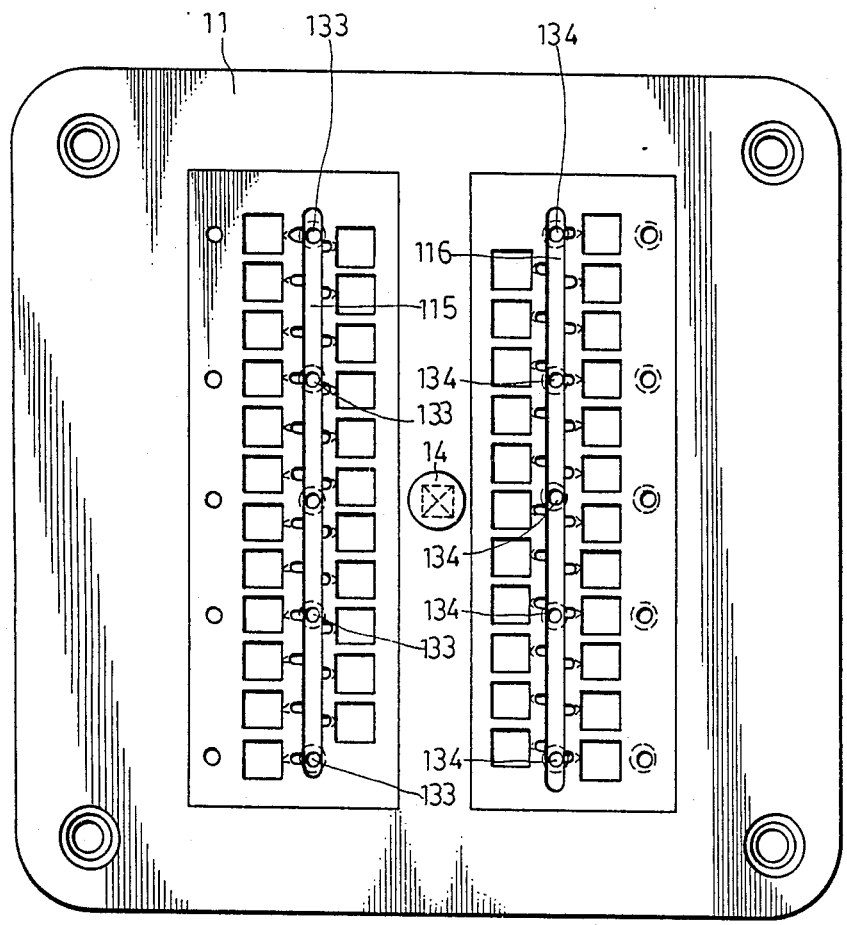
FIG. 2 is a partial sectional view taken on the line A—A of FIG. 1.
Figure 3:
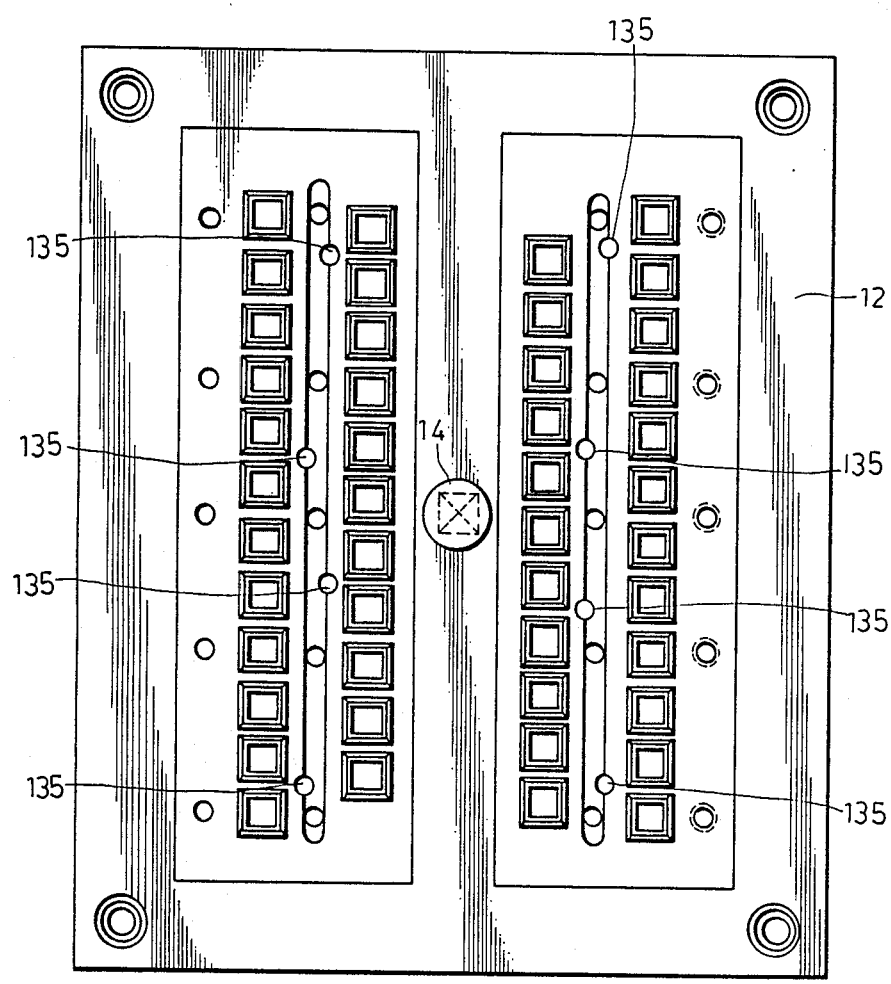
FIG. 3 is a partial sectional view taken on the line B—B of FIG. 1.

Referring now to FIG. 1, there is shown a sectional view of a mold assembly 10 of an apparatus 300 (shown in FIG. 5A) which is adapted to perform a two-coloring injection process and to illustrate the operation of the invention. The mold assembly 10 includes an upper-half mold 11, a movable and rotatable lower-half mold 12, and a movable supporting plate 13 provided at a position under the lower-half mold 12. The lower-half mold 12 is mounted on the upper end of an axle 14 which is driven by an air compression cylinder 15 provided at the lower end thereof. At a suitable position of the axle 14, a number of grooves 141 are provided around the axle to engage with a transmission gear 142 which in turn engages with a driving gear 143. The driving gear 143 is driven by a hydraulic mechanism (not shown) to drive the lower half mold 12 in a 180-degree rotation. Thus, by the operation of the air compression cylinder 15, the lower-half mold 12 as well as the supporting plate 13 can be reciprocally or telescopically moved in an up and down direction so as to perform the reciprocal closing and opening operations of the mold assembly 10 with the upper-half mold 11. As shown in FIG. 1, the left side of the upper half mold 11 is provided with a number of cavities 111 which are used for the first coloring injection, usually for molding different characters. Similarly, the right side of the upperhalf mold 11 is provided with a number of cavities 112 which are used for the second coloring injection, usually for molding key housings which embrace the characters to form a number of complete keys. In the mold assembly 10, there are provided a suitable number of sprues 113, 114 and runners 115, 116 through which the cavities communicate. After the first coloring injection, by the operation of the hydralic mechanism, the lower-half mold 12 and the supporting plate 13 will be rotated 180 degrees (best shown in FIG. 4c), so that the second coloring injection may be performed.

Figure 4A:
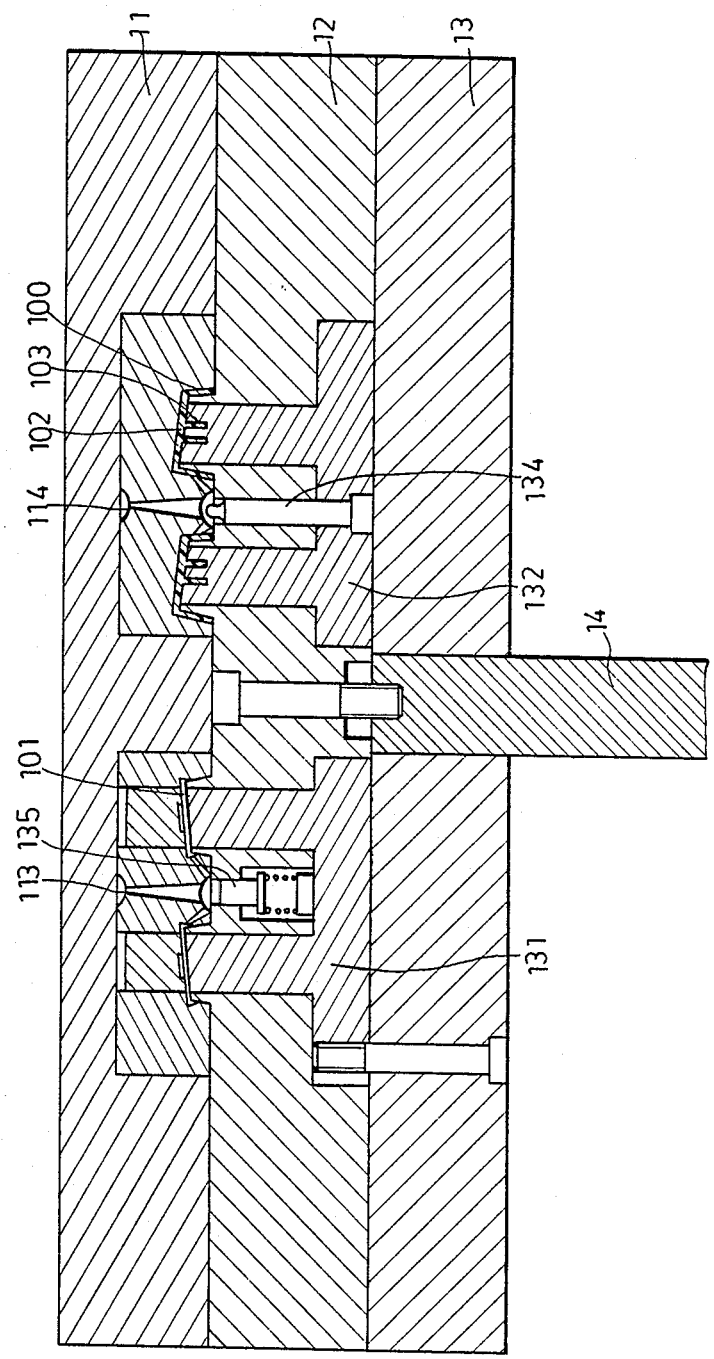
FIG. 4A is a partial sectional view of the mold assembly shown in FIG. 1 for illustrating the injection step of the method according to this invention.

Referring to FIGS. 2 to 4B, it is clearly shown that protrusions 131, 132 are provided on the supporting plate 13 for protruding corresponding throughways 131a, 132a of the lower-half mold 12 to contact tightly against key cavities when the mold assembly 10 is closed. Between each pair of adjacent protrusions 131, 132 there is provided a protruding pin 133, 134 by which the residual injection scrap in the runners 115, 116 will be drawn out of the sprues 113, 114 after the injection process when the mold assembly 10 is opened (as best shown in FIG. 4B). The lower-half mold 12 is further provided with a number of resilient devices 135 located between each adjacent throughway 131a, 132a therethrough. The upper ends of the resilient devices 135 could protrude out of the lower-half mold 12, however, they are depressed and kept in the lower-half mold 12 by the under side of the upper-half mold 11 when the mold assembly 10 is closed. Therefore, after each injection when the mold assembly 10 is opened, by the expansion of the resilient devices 135, the residual injection scrap in the runners 115, 116 will be moved away from the lower-half mold 12.

The most important feature in the above described injection proceeding is that, according to the invention, the numbers of cavities 111, 112 in the mold assembly 10 may be the same as that of a computer key board. Furthermore, the arrangement of the cavities, which includes the locations of the cavities and the distance therebetween is the same as that of a computer keyboard. Therefore, upon completion of the twocoloring injection process, all the different computer keys 100 (best shown in FIG. 4D) which are going to be assembled with switches 201 of a board 200 (best shown in FIG. 6) are molded.

Figure 4C:
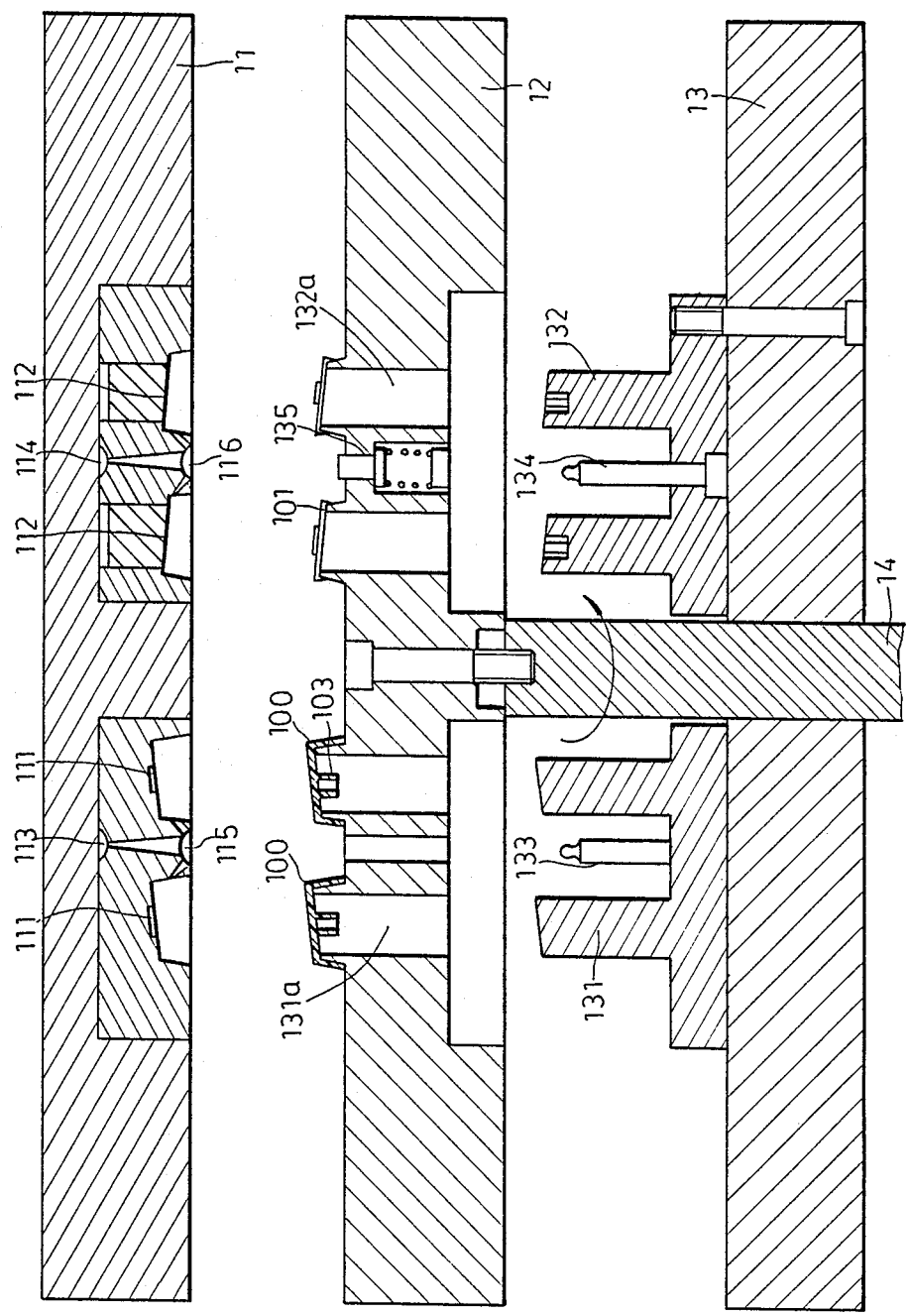
FIG. 4c is a partial sectional view of the mold assembly shown in FIG. 1 for illustrating a lower-half mold and a supporting plate being rotated 180 degrees so as to start the second injection step of a two-coloring injection molding.
Figure 4D:
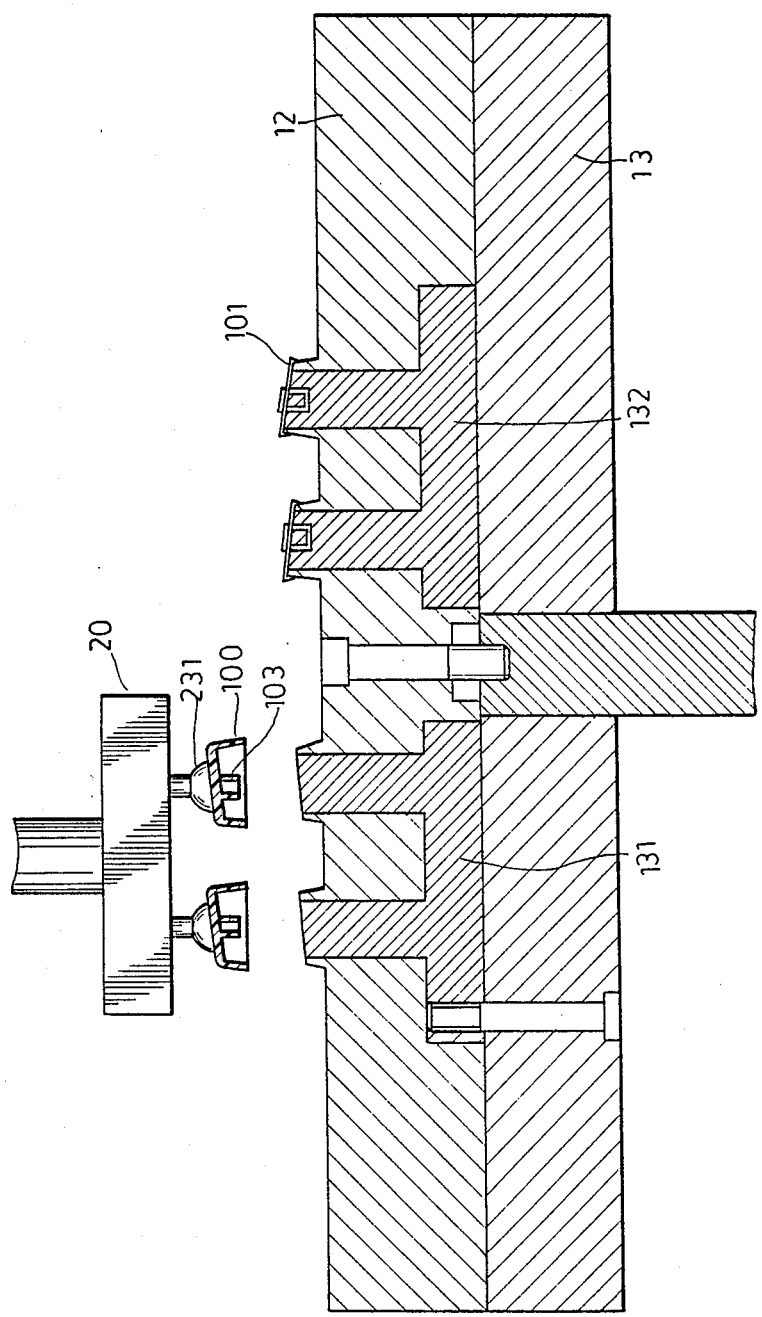
FIG. 4D is a partial sectional view of the apparatus shown in FIG. 1, in which a taking-out device is positioned above the lower-half mold to move the molded keys, in their original arrangement, to a position for socketing them to a number corresponding to the number of switches mounted on a board.
Figure 5A:
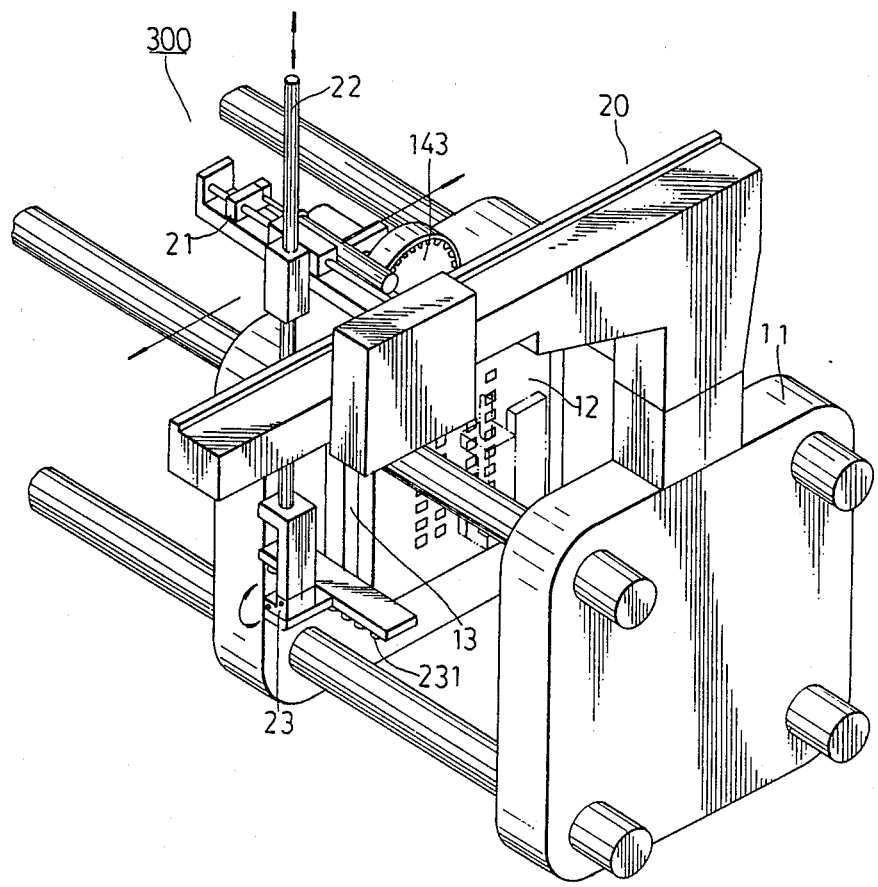
FIG. 5A is a perspective, fragmentary view of the apparatus shown in FIG. 1.
Figure 5B:
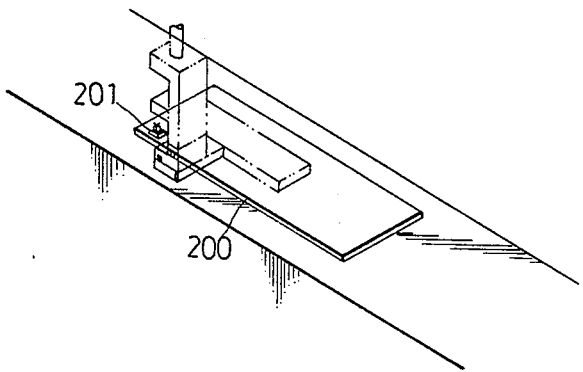
FIG. 5B is an enlarged perspective view of a pressing device and of the board shown in FIG. 5A.
Figure 6:
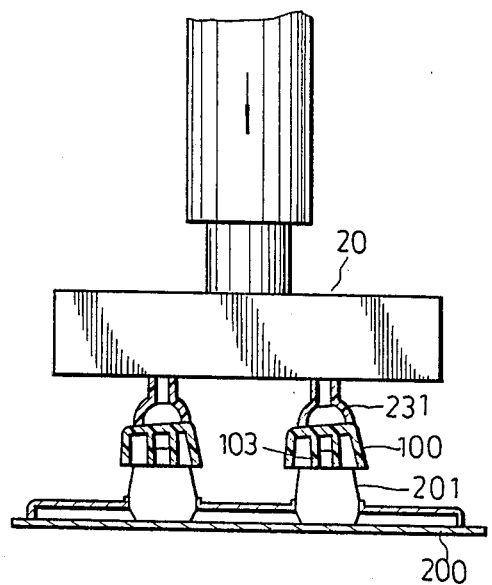
FIG. 6 is sectional scheme of the taking-out device and of the board for illustrating the socketing step according to the invention.

FIG. 4C shows that the lower half mold 12 is rotated to move the molded keys 100 from the right to the left after the mold is opened. When the lower half mold 12 is lowered, as shown in FIG. 4D the molded keys 100 are released from the cavities of the lower-half mold 12 by the protrusions 131 of the supporting plate 13 which are against a lower protrusion 103 of the molded keys 100. And then, a taking-out device 20 is moved to a position above the lower-half mold 12. Referring to FIGS. 5A, 5B and 6, the taking-out device 20 is mounted on a frame of the apparatus 300 and includes a bracket 21 which is capable of making a horizontal movement. On the bracket 21 a vertical movable arm 22 is provided. The lower end of the vertical movable arm 22 is pivoted with a wrist portion 23 which can be rotated at a right angle and on which a number of vacuum absorbing cups 231 are provided. The arrangement of the vacuum absorbing cups 231 is made in accordance with the arranged order of the switches 201 of the board 200. Therefore, by means of the taking-out device 20, the molded keys 100 will be socketed in the corresponding switches 201 of the board 200 respectively (shown in FIG. 6). The board 200 is preferably positioned at a place near the mold assembly 10 so that the absorbed molded keys 100 can be easily moved onto the board 200 for socketing with the switches 201 by the taking-out device 20.

Figure 7:
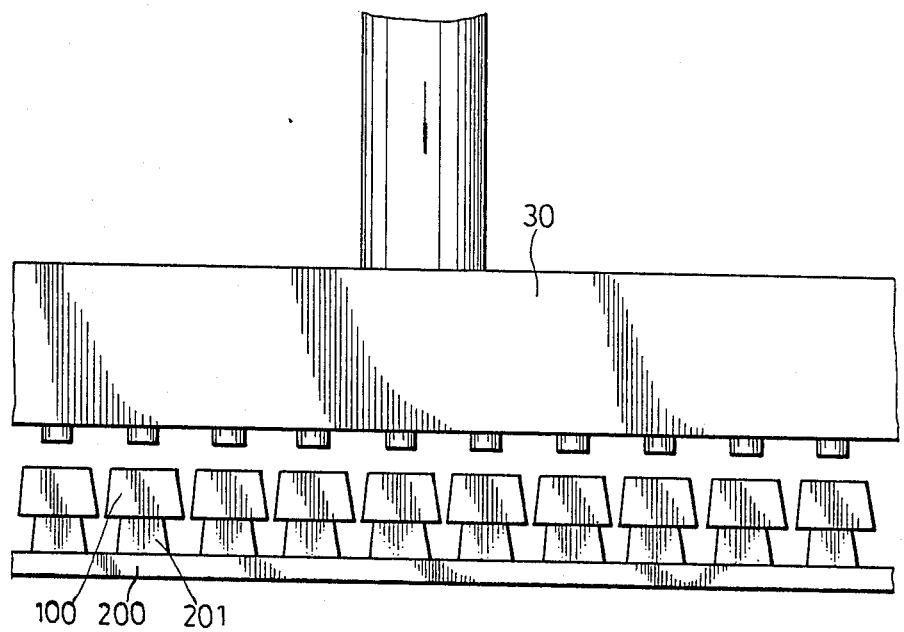
FIG. 7 is a partial sectional view of a press and of the socketed board for illustrating the pressing step according to the invention.

The final step of the novel method according to the invention is using a pressing device 30 to press the pre-socketted molded keys 100 down so as to tightly engage them with the switches 201 to form a complete key board (as shown in FIG. 7).

It should be understood that due to the different sizes of computer keyboards, in practice, as to the manufacture of the computer keyboard, the manufacturer may firstly divide the keys into several sections. Then, the injection molding and assembling of each section of keys may be performed successively.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. A manufacturing method of a keyboard comprising:
    molding keys from an injection mold in which cavities thereof coincide with cavities of a commercial keyboard;
    moving said keys out of said injection mold to a position above a number of corresponding switches of a board;
    socketing said keys with said switches; and pressing said socketed keys together with said switches.

2. A manufacturing method of a keyboard as claimed in claim 1, in which the numbers of said cavities are a part of that of a complete commercial keyboard.

3. A manufacturing method of a keyboard as claimed in claim 1, in which the numbers of said cavities are the same as that of a complete commercial keyboard.

4. A manufacturing method of a keybaord as claimed in claim 1, in which said molded keys may be released from said injection mold after the molding step so that they may be easily removed from said injection mold.

5. A manufacturing method of a keyboard as claimed in claim 1, in which said board is positioned at a place near said injection mold.

6. A manufacturing method of a keyboard as claimed in claim 1, in which said moving and socketing steps are conducted by using a taking-out device.

* * * * *